United States Patent
Woods

(10) Patent No.: US 11,261,977 B2
(45) Date of Patent: Mar. 1, 2022

(54) SHUTTLE VALVE

(71) Applicant: Parker-Hannifin Corporation, Cleveland, OH (US)

(72) Inventor: Andrew T. Woods, Kalamazzo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 90 days.

(21) Appl. No.: 16/808,585

(22) Filed: Mar. 4, 2020

(65) Prior Publication Data

US 2020/0378506 A1 Dec. 3, 2020

Related U.S. Application Data

(60) Provisional application No. 62/853,382, filed on May 28, 2019.

(51) Int. Cl.
*F16K 11/065* (2006.01)
*F16K 27/02* (2006.01)
*F16K 27/04* (2006.01)

(52) U.S. Cl.
CPC .......... *F16K 11/065* (2013.01); *F16K 27/041* (2013.01)

(58) Field of Classification Search
CPC ....... Y10T 137/2567; Y10T 137/86879; F16K 11/044; F16K 11/065; F16K 27/0209; F16K 27/0263
See application file for complete search history.

(56) References Cited

U.S. PATENT DOCUMENTS

| 2,811,979 | A | * | 11/1957 | Presnell | ................... | F15B 13/02 |
| | | | | | | 137/112 |
| 3,038,487 | A | | 11/1960 | Gardner | | |
| 3,338,257 | A | * | 8/1967 | Ferguson | ............ | F16K 11/0445 |
| | | | | | | 137/112 |
| 3,917,318 | A | * | 11/1975 | Legris | ..................... | F16L 37/56 |
| | | | | | | 285/18 |
| 4,291,719 | A | * | 9/1981 | Lehmann | .............. | F16K 11/044 |
| | | | | | | 137/112 |
| 4,437,492 | A | | 3/1984 | Taylor | | |

(Continued)

FOREIGN PATENT DOCUMENTS

| CH | 674 251 | A5 | 5/1990 |
| JP | S55 44116 | A | 3/1980 |

OTHER PUBLICATIONS

Extended European Search Report prepared by the European Patent Office in application No. EP 20 16 6034.7 dated Sep. 11, 2020.

*Primary Examiner* — Seth W. Mackay-Smith
(74) *Attorney, Agent, or Firm* — McDonnell Boehnen Hulbert & Berghoff LLP

(57) ABSTRACT

An example shuttle valve includes: (i) a valve body comprising a longitudinal cylindrical bore, a first inlet port, a second inlet port, an outlet port, and a key that protrudes radially inward within the longitudinal cylindrical bore; and (ii) a shuttle mounted in the longitudinal cylindrical bore and configured to move axially therein, wherein the shuttle comprises a plurality of radial protrusions that protrude radially outward from, and are circumferentially spaced apart about, a peripheral surface of the shuttle, and wherein the key of the valve body is interposed between two radial protrusions of the plurality of radial protrusions.

18 Claims, 5 Drawing Sheets

(56) References Cited

U.S. PATENT DOCUMENTS

| | | | |
|---|---|---|---|
| 5,605,360 A * | 2/1997 | Kurisaki | G01L 19/0007 |
| | | | 285/93 |
| 8,171,951 B2 * | 5/2012 | Quendt | F15B 13/028 |
| | | | 137/112 |
| 8,397,742 B2 | 9/2013 | Thrash et al. | |
| 9,719,600 B2 | 8/2017 | Patterson | |
| 10,190,696 B2 | 1/2019 | Summers | |
| 2015/0369002 A1 | 12/2015 | Patterson | |

* cited by examiner

600

602 — PROVIDING A VALVE BODY OF A SHUTTLE VALVE, WHEREIN THE VALVE BODY COMPRISES A LONGITUDINAL CYLINDRICAL BORE, A FIRST INLET PORT, A SECOND INLET PORT, AND AN OUTLET PORT, AND WHEREIN THE VALVE BODY COMPRISES A KEY THAT PROTRUDES RADIALLY INWARD WITHIN THE LONGITUDINAL CYLINDRICAL BORE

604 — MOUNTING A SHUTTLE IN THE LONGITUDINAL CYLINDRICAL BORE OF THE VALVE BODY, WHEREIN THE SHUTTLE COMPRISES A PLURALITY OF RADIAL PROTRUSIONS THAT PROTRUDE RADIALLY OUTWARD FROM A CENTRAL PORTION OF THE SHUTTLE, WHEREIN THE PLURALITY OF RADIAL PROTRUSIONS ARE CIRCUMFERENTIALLY SPACED APART ABOUT A PERIPHERAL SURFACE OF THE CENTRAL PORTION, AND WHEREIN THE KEY OF THE VALVE BODY IS INTERPOSED BETWEEN TWO RADIAL PROTRUSIONS OF THE PLURALITY OF RADIAL PROTRUSIONS

606 — MOUNTING A FIRST FITTING TO THE FIRST INLET PORT, A SECOND FITTING TO THE SECOND INLET PORT, AND A THIRD FITTING TO THE OUTLET PORT, WHEREIN EITHER THE FIRST FITTING OR THE SECOND FITTING FORMS A FIRST SEAT FOR THE SHUTTLE, AND WHEREIN THE VALVE BODY FORMS A SECOND SEAT FOR THE SHUTTLE

FIG. 6

SHUTTLE VALVE

CROSS REFERENCE TO RELATED APPLICATION

The present application claims priority to U.S. Provisional patent application Ser. No. 62/853,382, filed on May 28, 2019, and entitled "Shuttle Valve," the entire contents of which are herein incorporated by reference as if fully set forth in this description.

BACKGROUND

A shuttle valve is a type of valve that allows fluid to flow therethrough from one of two fluid sources. Shuttle valves are used in pneumatic and hydraulic systems.

A shuttle valve can have a valve body defining three openings or ports that represent a first inlet, a second inlet, and an outlet. The shuttle valve can also include a movable element configured to move freely within the valve body. When pressure from a fluid is exerted through a particular inlet, it pushes the movable element towards the opposite inlet. This movement may block the opposite inlet, while allowing the fluid to flow from the particular inlet to the outlet. This way, two different fluid sources can provide pressurized fluid to an outlet without back flow from one source to the other.

In some cases, it may be desirable to configure the shuttle valve to allow a high flow rate of fluid therethrough and reduce any partial blockage that can be caused by the movable element. Further, in some cases, the movable element can deteriorate overtime as it cycles back and forth from one inlet to the other, thereby causing leakage. It may thus also be desirable to configure the shuttle valve to reduce the likelihood of leakage over time. It is with respect to these and other considerations that the disclosure made herein is presented.

SUMMARY

The present disclosure describes implementations that relate to a shuttle valve.

In a first example implementation, the present disclosure describes a shuttle valve. The shuttle valve includes: (i) a valve body comprising a longitudinal cylindrical bore, a first inlet port, a second inlet port, an outlet port, and a key that protrudes radially inward within the longitudinal cylindrical bore; and (ii) a shuttle mounted in the longitudinal cylindrical bore and configured to move axially therein, wherein the shuttle comprises a plurality of radial protrusions that protrude radially outward from, and are circumferentially spaced apart about, a peripheral surface of the shuttle, and wherein the key of the valve body is interposed between two radial protrusions of the plurality of radial protrusions. The shuttle is configured to shift between: (i) a first position adjacent to the first inlet port, wherein at the first position the shuttle blocks the first inlet port while allowing pressurized fluid to flow from the second inlet port to the outlet port, and (ii) a second position adjacent to the second inlet port, wherein at the second position the shuttle blocks the second inlet port while allowing pressurized fluid to flow from the first inlet port to the outlet port.

In a second example implementation, the present disclosure describes a fluid system. The fluid system includes: a first source of pressurized fluid; a second source of pressurized fluid; and a shuttle valve. The shuttle valve includes: (i) a valve body comprising a longitudinal cylindrical bore, a first inlet port fluidly coupled to the first source, a second inlet port fluidly coupled to the second source, an outlet port, and a key that protrudes radially inward within the longitudinal cylindrical bore; and (ii) a shuttle mounted in the longitudinal cylindrical bore and configured to move axially therein, wherein the shuttle comprises a plurality of radial protrusions that protrude radially outward from, and are circumferentially spaced apart about, a peripheral surface of the shuttle, and wherein the key of the valve body is interposed between two radial protrusions of the plurality of radial protrusions, wherein the shuttle is configured to shift between: (i) a first position adjacent to the first inlet port, wherein at the first position the shuttle blocks the first inlet port while allowing pressurized fluid to flow from the second source through the second inlet port to the outlet port, and (ii) a second position adjacent to the second inlet port, wherein at the second position the shuttle blocks the second inlet port while allowing pressurized fluid to flow from the first source through the first inlet port to the outlet port.

In a third example implementation, the present disclosure describes a method. The method includes: (i) providing a valve body of the shuttle valve, wherein the valve body comprises a longitudinal cylindrical bore, a first inlet port, a second inlet port, and an outlet port, and wherein the valve body comprises a key that protrudes radially inward within the longitudinal cylindrical bore; and mounting a shuttle in the longitudinal cylindrical bore of the valve body, wherein the shuttle comprises a plurality of radial protrusions that protrude radially outward from a central portion of the shuttle, wherein the plurality of radial protrusions are circumferentially spaced apart about a peripheral surface of the central portion, and wherein the key of the valve body is interposed between two radial protrusions of the plurality of radial protrusions.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 illustrates a flowchart of a method of assembling a shuttle valve, in accordance with an example implementation.

DETAILED DESCRIPTION

Figure 1:
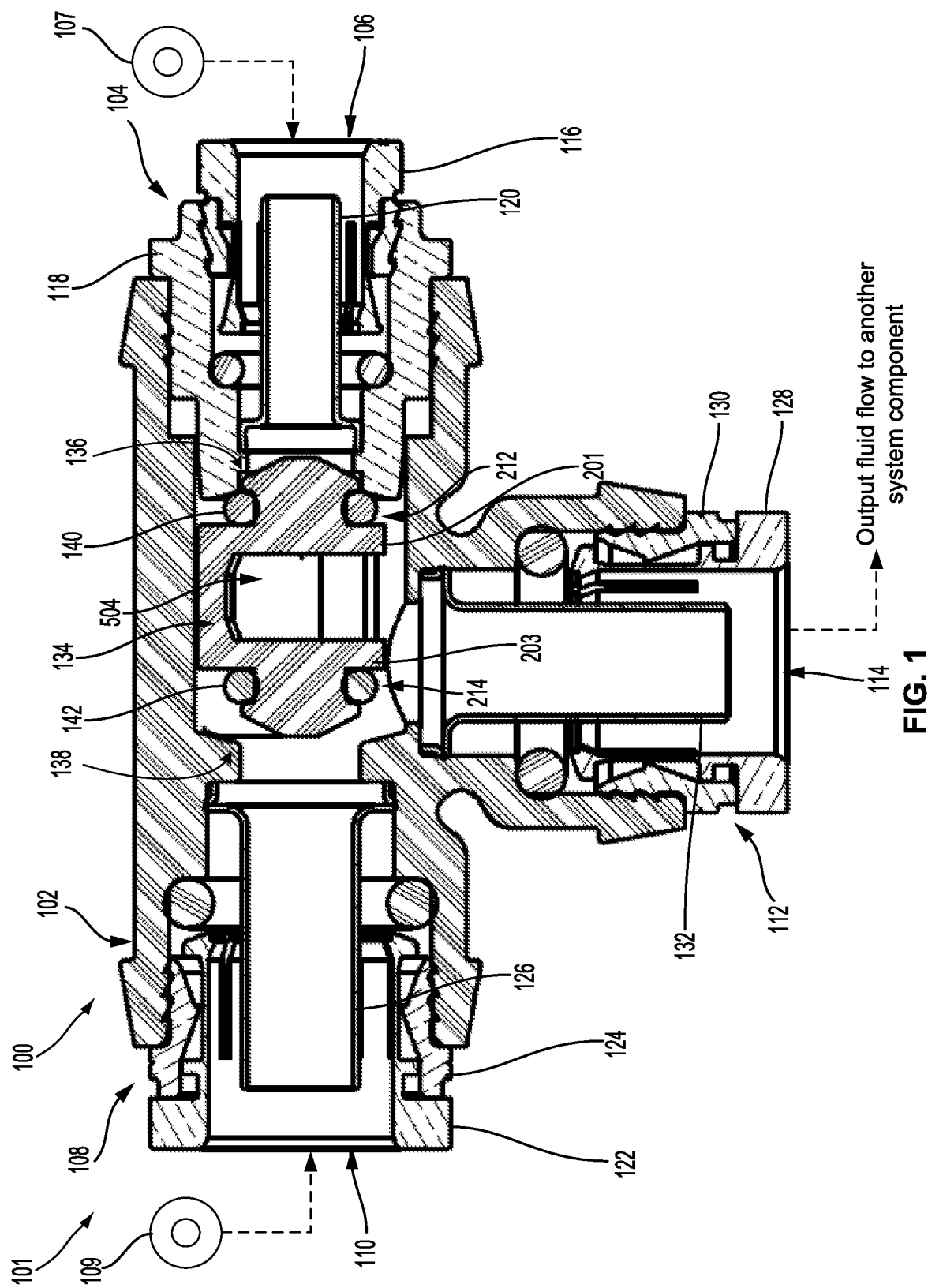
FIG. 1 illustrates a cross-sectional side view of a shuttle valve, in accordance with an example implementation.

Example shuttle valves are configured to receive flow from two different sources and divert the fluid with the higher pressure level to an outlet port. Shuttle valves can be used in various types of fluid systems (e.g., hydraulic or pneumatic systems).

A shuttle valve can include a valve body comprising three openings that represent a first inlet port, a second inlet port, and an outlet port. A movable element moves within the valve body. When pressure from a fluid is exerted through a particular inlet, it pushes the movable element towards the opposite inlet where it is seated at a respective seat to block flow to the opposite inlet, while allowing the fluid to flow from the particular inlet port to the outlet port. As the movable element cycles back and forth and impacts respective seats of the shuttle valve, structural integrity of the movable element may deteriorate.

As an example for illustration, in a pneumatic system, the movable element can be a ball made of rubber or similar material. As the ball moves back and forth between two seats corresponding to the two inlet ports of the shuttle valve, the impact of the ball with the seats can cause a ring indentation on the ball under fluid pressure and temperature. Further the ball is free to rotate about its axis, and thus the orientation of the ring indentation can change over time as the location of impact of the ball with the seats changes. As the shuttle valve cools down and then used again, the ring indentation can form a leakage path between the two inlet ports of the shuttle valve, which is undesirable.

Further, in some examples, if the pressure differential between pressure levels at the two inlet ports is not substantial (i.e., pressure levels of fluid at the two inlets are close to each other), the movable element can be positioned in the middle of its stroke rather than being pushed all the way to one of the seats at the respective inlet ports. As a result, the movable element can obstruct fluid flow to the outlet port of the valve. Further, in the cases where the movable element is made of a compressible material (e.g., a rubber ball), under high pressure, the movable element can be squeezed through the outlet port and exits the shuttle valve therethrough, thereby causing the shuttle valve to fail.

It may thus be desirable to have a shuttle valve with a movable element that retains its orientation as it traverses the shuttle valve from one inlet port (or seat) to the other, and also effectively seals any leakage path and precludes fluid flow between the two inlet ports. It may also be desirable to have the movable element configured to allow high flow rates through the valve. It may further be desirable to configure the movable element such that it does not exit the shuttle valve under high pressures. Disclosed herein is a shuttle valve with a movable element configured to substantially retain its orientation, effective precludes leakage between the inlets, precluded blockage of the outlet opening, and reduce or eliminate the likelihood of forcing the movable element to exit the outlet opening under pressure.

FIG. 1 illustrates a cross-sectional side view of a shuttle valve 100, in accordance with an example implementation. The shuttle valve 100 is used in a fluid system 101 (e.g., a hydraulic or pneumatic system).

The shuttle valve 100 has a valve body 102 that defines a longitudinal cylindrical cavity or bore therein. The longitudinal cylindrical bore receives valve components therein and can include supporting surfaces and retaining features.

The valve body 102 can be configured to define at a first end thereof a first inlet opening or first inlet port 106 configured to receive a first fitting 104. The first inlet port 106 can be configured to receive pressurized fluid from a first source 107 of pressurized fluid in the fluid system 101. A second end of the valve body 102 can be configured to define a second inlet opening or second inlet port 110 configured to receive a second fitting 108. The second inlet port 110 can be configured to receive pressurized fluid from a second source 109 of pressurized fluid in the fluid system 101.

In examples, as shown in FIG. 1, the second inlet port 110 can be coaxial with and mounted opposite to the first inlet port 106. However, in other examples, the inlet ports 106, 110 might not be coaxial or mounted opposite to each other.

The valve body 102 further defines or includes an outlet opening or an outlet port 114 configured to receive a third fitting 112. In examples, as shown in FIG. 1, the outlet port 114 can be transverse to both inlet ports 106, 110. However, in other examples, the outlet port 114 might not be transverse to the inlet ports 106, 110. Thus, the inlet ports 106, 110 and the outlet port 114 can be configured differently, and the configuration shown in FIG. 1 is an example for illustration only.

The fittings 104, 108, and 112 can have several configurations, and they are configured to allow for fluidly coupling the shuttle valve 100 to tubes or hoses that communicate fluid to and from the shuttle valve 100. In the example configuration shown in FIG. 1, the fittings 104, 108, 112 are configured as push-to-connect fittings that couple to respective tubes of a hydraulic or pneumatic system to the shuttle valve 100.

For example, the first fitting 104 can include a first collet 116 that has the opening associated with the first inlet port 106. The first collet 116 is configured to be inserted into or "ride on" a first sleeve 118 to be coupled thereto. For instance, the first collet 116 can be threaded into the first sleeve 118, or can have barbs that allow the first collet 116 to be press-fitted or interference-fitted to the first sleeve 118.

The first sleeve 118 can be pressed into the valve body 102 (e.g., via threads or barbed interference fit) to be coupled thereto. The first fitting 104 further includes a tube support 120 that is configured to be coupled to a tube that provides fluid to the first inlet port 106.

Similarly, the second fitting 108 can include a second collet 122 that has the opening associated with the second inlet port 110. The second collet 122 is configured to be coupled to a second sleeve 124, and the second sleeve 124 is configured to be coupled to the valve body 102. The second fitting 108 further includes a tube support 126 that is configured to be coupled to a tube that provides fluid to the second inlet port 110.

Similarly, the third fitting 112 can include a third collet 128 that has the opening associated with the outlet port 114. The third collet 128 is configured to be coupled to a third sleeve 130, and the third sleeve 130 is configured to be coupled to the valve body 102. The third fitting 112 further includes a tube support 132 that is configured to be coupled to a tube that communicates fluid from the outlet port 114 to another component of the fluid system 101. The configuration of the fittings 104, 108, and 112 illustrated and described herein is an example configuration, and other types of fittings can be used.

The shuttle valve 100 further includes a shuttle 134 disposed in and configured to be axially movable within the longitudinal cylindrical bore of the valve body 102. The shuttle 134 an also be referred to as a shuttle component, a movable element, a spool, or a poppet.

The shuttle 134 is shiftably mounted within the valve body 102. If a pressure level of the pressurized fluid provided by the second source 109 to the second inlet port 110 is higher than a respective pressure level of the pressurized fluid provided by the first source 107 to the first inlet port 106, the shuttle 134 shifts toward the first sleeve 118 (e.g., to the right in FIG. 1). Particularly, the shuttle 134 travels axially within the longitudinal cylindrical bore of the valve body 102 until the shuttle 134 reaches a position where the shuttle 134 rests against or is seated at a first seat 136 formed as an annular protrusion in an interior peripheral surface of the first sleeve 118. A first end of the shuttle 134 has a tapered or conical circumferential surface that contacts the first seat 136 when the shuttle 134 is seated at the first seat 136.

At this position, fluid provided to the first inlet port 106 is blocked from flowing to either the second inlet port 110 or the outlet port 114. However, pressurized fluid provided to the second inlet port 110 flows through the shuttle valve 100 to the outlet port 114. This position of the shuttle 134 can be referred to as a first position.

On the other hand, if a pressure level of the pressurized fluid provided by the first source 107 to the first inlet port 106 is higher than a respective pressure level of the pressurized fluid provided by the second source 109 to the second inlet port 110, the shuttle 134 shifts toward the second inlet port 110 (e.g., to the left in FIG. 1). The shuttle 134 can travel axially within the longitudinal cylindrical bore of the valve body 102 until the shuttle 134 reaches a second position where the shuttle 134 rests against or is seated at a second seat 138 formed as an annular protrusion in an interior peripheral surface of the valve body 102. In this manner, the shuttle 134 may shift between the first and second positions based on the pressure level at the inlet ports 106, 110.

Figure 2:
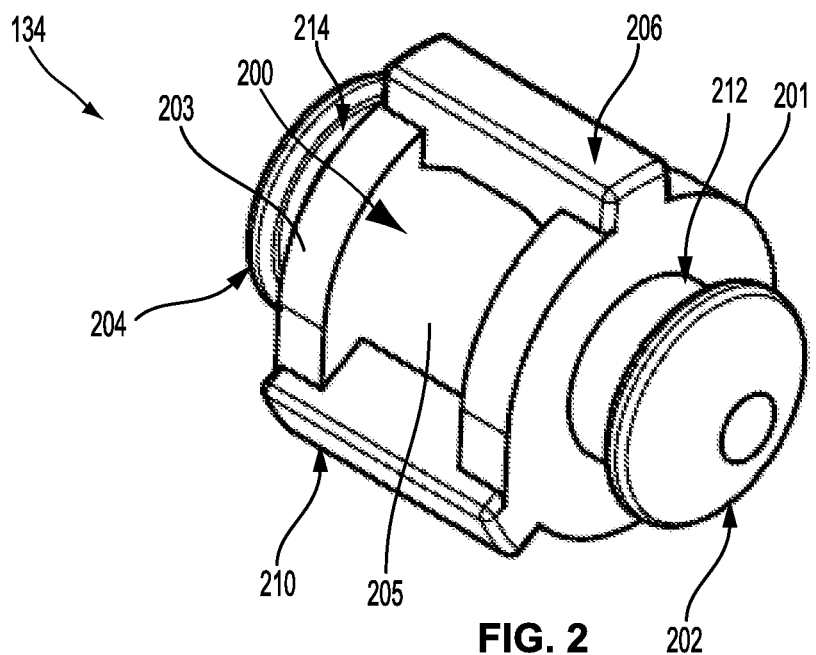
FIG. 2 illustrates a perspective view of a shuttle of the shuttle valve of FIG. 1, in accordance with an example implementation.
Figure 3:
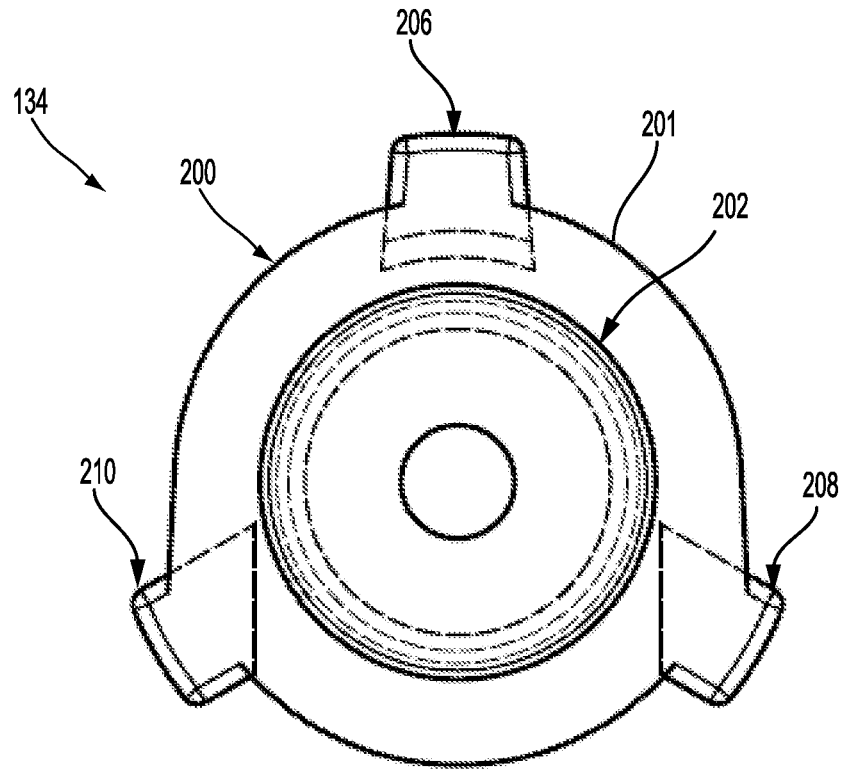
FIG. 3 illustrates a front view of the shuttle of FIG. 2, in accordance with another example implementation.
Figure 4:
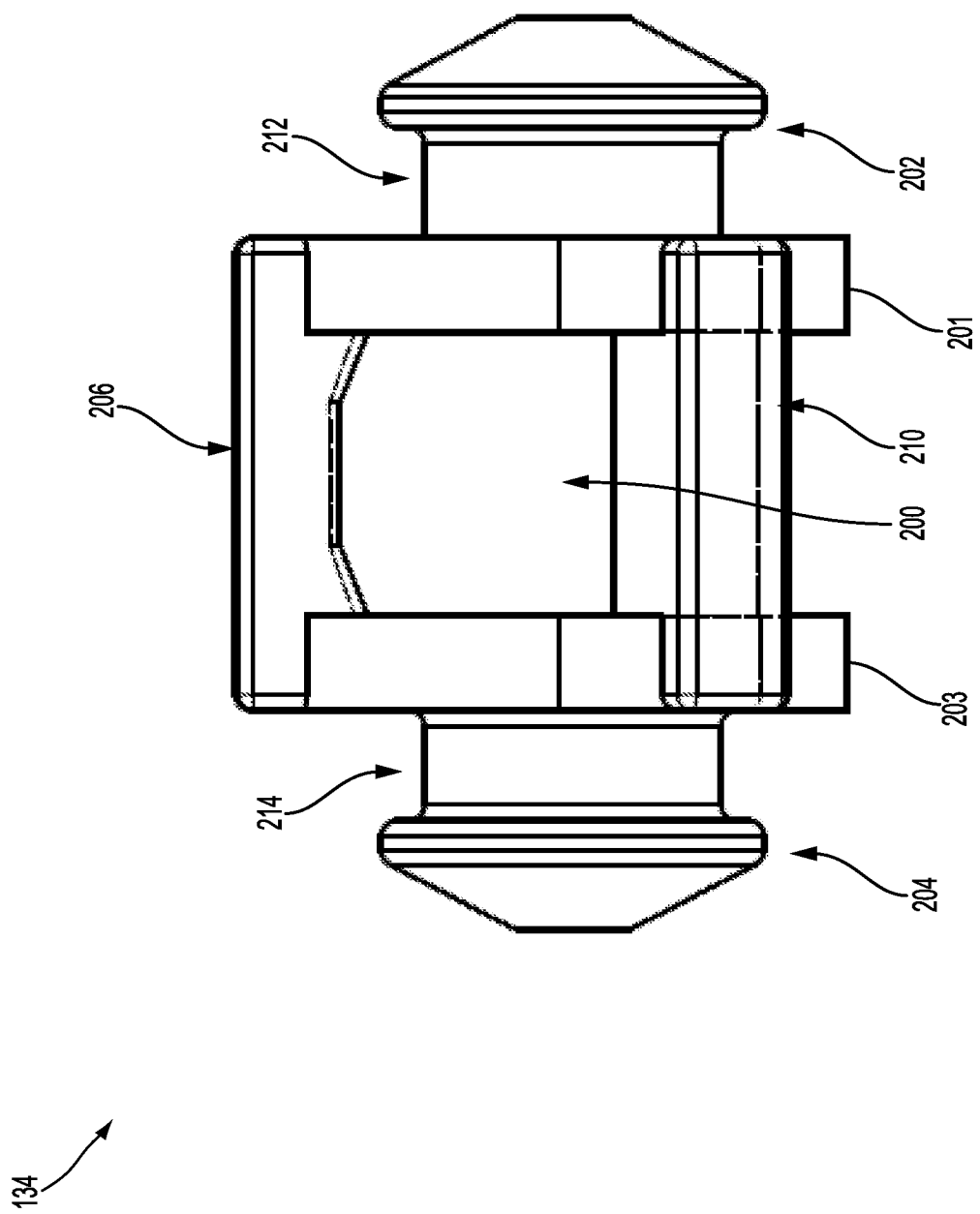
FIG. 4 illustrates a side view of the shuttle of FIG. 2, in accordance with another example implementation.

FIG. 2 illustrates a perspective view of the shuttle 134, FIG. 3 illustrates a front view of the shuttle 134, and FIG. 4 illustrates a side view of the shuttle 134, in accordance with an example implementation. FIGS. 2, 3, and 4 are described together.

The shuttle 134 has a central portion 200 interposed between a first end portion 202 and and a second end portion 204. The central portion 200 can be configured to have a larger diameter than respective diameters of the end portions 202, 204. The central portion 200 can have a first flanged portion 201 at a first end thereof, a second flanged portion 203 at a second end thereof, and a middle portion 205 disposed between the flanged portions 201, 203 and having a smaller diameter compared to the flanged portions 201, 203.

The shuttle 134, and particularly the central portion 200, includes a plurality of radial protrusions, such as a first radial protrusion 206, a second radial protrusion 208, and a third radial protrusion 210. The radial protrusions 206, 208, 210 protrude radially outward from the central portion 200 and extend longitudinally along a length of the central portion 200. The radial protrusions 206, 208, 210 circumferentially spaced apart in an array about a periphery or a peripheral surface of the central portion 200. In other example implementations, the radial protrusions 206, 208, 210 extend longitudinally along a partial length of the central portion 200; in other words, the radial protrusions can be axially shorter than shown in FIGS. 2, 4.

In the configuration shown in FIGS. 2-4, the shuttle 134 comprises three radial protrusions 206, 208, 210 that are disposed 120 degrees apart from each other. In other configurations, fewer or more than three radial protrusions can be used.

The radial protrusions 206, 208, 210 interface with an interior peripheral surface of the valve body 102 to enable the shuttle 134 to slide back and forth while being aligned with the interior peripheral surface of the valve body 102. In other words, the radial protrusions 206, 208, 210 interface with the interior peripheral surface of the valve body 102 to enable the shuttle 134 to operate as a cylinder that slides back and forth along the interior peripheral surface of the valve body 102.

As shown in FIGS. 2, 4, the first end portion 202 is configured to have a first annular groove 212, and the second end portion 204 is configured to have a second annular groove 214. The annular grooves 212, 214 are configured to receive therein respective radial seals (e.g., O-rings) to preclude leakage from a respective inlet port when the shuttle 134 shifted to the respective inlet port.

Particularly, referring back to FIG. 1, the shuttle valve 100 includes a first radial seal or first O-ring 140 disposed in the first annular groove 212 of the shuttle 134. When the shuttle 134 is in the position shown in FIG. 1 where it is seated at the first seat 136, the first O-ring 140 can reduce or block leakage flow from the first inlet port 106 to the outlet port 114 or the second inlet port 110. The term "block" is used throughout herein to indicate substantially preventing fluid flow except for minimal acceptable flow of drops per minute, for example.

Similarly, the shuttle valve 100 includes a second radial seal or second O-ring 142 disposed in the second annular groove 214 of the shuttle 134. When the shuttle 134 shifts to toward the second inlet port 110, the second O-ring 142 interacts with the second seat 138 to reduce or block leakage flow from the second inlet port 110 to the outlet port 114 or the first inlet port 106.

The flanged portions 201, 203 of the central portion 200 of the shuttle 134 provide axial support for the O-rings 140, 142 to retain them in their respective annular grooves 212, 214. The annular grooves 212, 214 can be configured to have dimensions that allow using O-rings 140, 142 having standard sizes, rather than custom configurations, to reduce cost of the shuttle valve 100.

The shuttle valve 100 is configured such that as the shuttle 134 moves axially back and forth between the seats 136, 138, the shuttle 134 substantially maintains its orientation and does not rotate about its longitudinal axis. Particularly, the valve body 102 has a protrusion or key feature that interacts with a subset of the radial protrusions 206, 208, 210 to prevent substantial rotation of the shuttle 134 about its longitudinal axis relative to the valve body 102

Figure 5:
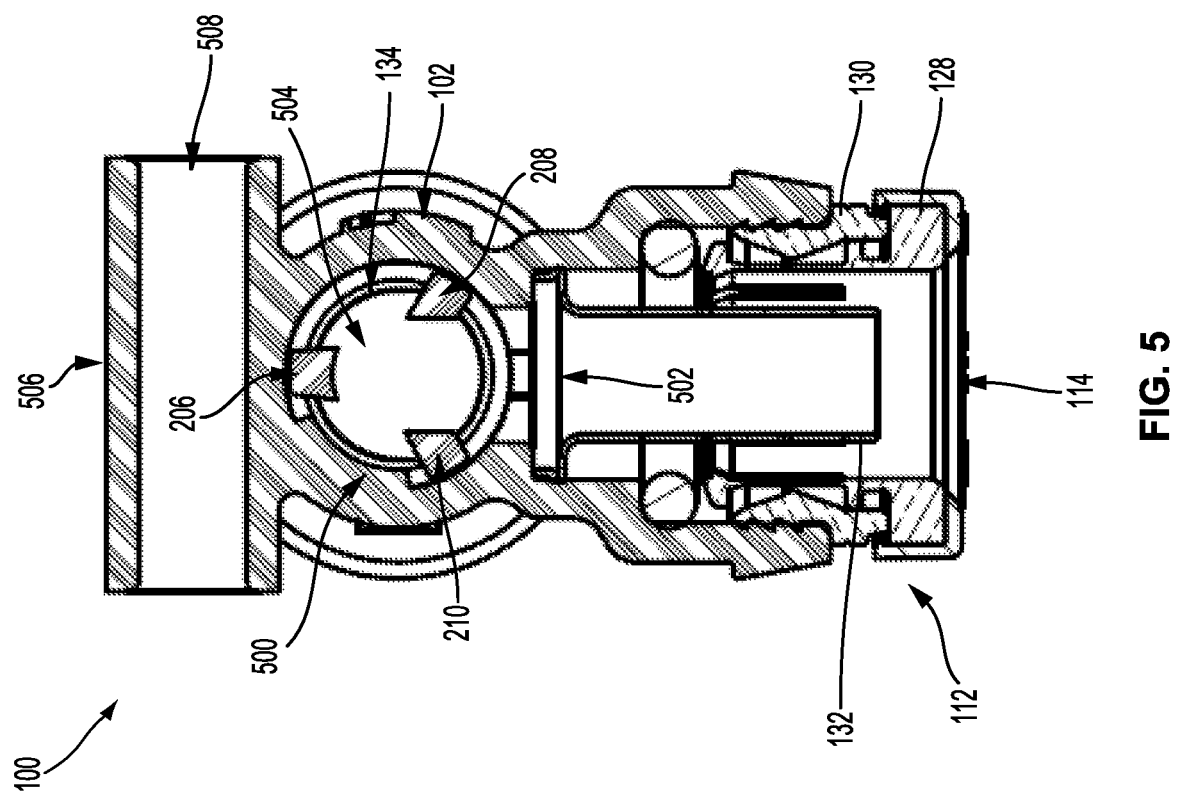
FIG. 5 illustrates a cross-sectional front view of the shuttle valve of FIG. 1, in accordance with an example implementation.

FIG. 5 illustrates a cross-sectional front view of the shuttle valve 100, in accordance with an example implementation. As depicted in FIG. 5, the valve body 102 includes a key 500 that protrudes radially inward in the longitudinal cylindrical bore of the valve body 102. The key 500 is configured as an arc configured to protrude in a curved space between a subset of the radial protrusions 206, 208, 210.

Particularly, the shuttle 134 can be positioned such that the key 500 is interposed between two of the radial protrusions 206, 208, 210. For instance, as shown in FIG. 5, the shuttle 134 can be positioned within the valve body 102 such that the key 500 is interposed between the radial protrusion 206 and the radial protrusion 210. The key 500 can extend longitudinally along the interior peripheral surface of the valve body 102 for the entire or partial length of the radial protrusions 206, 208, 210.

The arc of the key 500 substantially occupies the curved space between the radial protrusions 206, 210. In other words, an arc length of the key 500 can be slightly smaller than an arc length of the curved space between the radial protrusions 206, 210.

With this configuration, if the shuttle 134 rotates clockwise during operation of the shuttle valve 100, the radial protrusion 210 can interact or contact the key 500 to preclude the shuttle 134 from rotating by a substantial angle about its longitudinal axis. The term "substantial angle" is used herein to indicate an angle that is more than a threshold angle (e.g., 5 degrees). Particularly, the shuttle 134 can be allowed to rotate to the extent that there is a space or gap between the radial protrusion 210 and the key 500. However, the shuttle 134 is precluded from rotating to the extent that the radial protrusion 208 overlaps with and obstructs an opening 502 (e.g., a cross-hole in the valve body 102) that leads to the tube support 132 of the fitting 112.

Similarly, if the shuttle 134 rotates counter-clockwise during operation of the shuttle valve 100, the radial protrusion 206 can interact or contact the key 500 to preclude the shuttle 134 from rotating by a substantial angle (e.g., more than a threshold angle of 5 degrees) about its longitudinal axis. Particularly, the shuttle 134 can be allowed to rotate to the extent that there is a space or gap between the radial protrusion 206 and the key 500. However, the shuttle 134 is precluded from rotating to the extent that the radial protrusion 210 overlaps with and obstructs the opening 502 that leads to the tube support 132 of the fitting 112.

Thus, fluid from the first inlet port 106 or the second inlet port 110 is not obstructed as it flows to the outlet port 114. Further, fluid is allowed to flow around the O-ring 140, 142, then through the reduced diameter region of the shuttle 134 between the radial protrusion 208 and the radial protrusion 210, then through the opening 502 to the outlet port 114. This configuration enables the shuttle valve 100 to allow a higher fluid flow rate therethrough for a given port size.

Further, because the shuttle 134 is precluded from rotating substantially due to the interaction of the key 500 with the radial protrusions 206, 210, its orientation is maintained substantially the same as it translates back and forth between the seats 136, 138. This way, the seat location of the shuttle 134 or the second O-ring 142 that rests against the seats 136, 138, respectively, remains substantially the same, in contrast with a ball or movable element that is allowed to roll about its axis. As such, the position and orientation of the O-rings 140, 142 can remain substantially the same, thereby reducing the likelihood of forming a leakage path around the shuttle 134 when it interacts with either of the seats 136, 138 to block a corresponding inlet port.

As depicted in FIGS. 1 and 5, the shuttle 134 can be configured to be hollow, i.e., the shuttle 134 can have an inner chamber 504. This configuration has performance advantages. The shuttle 134 can move within the valve body 102 at significant speed, and sometimes back and forth in rapid succession, between the seats 136, 138. The hollow nature of the shuttle 134 reduces its mass, and thus reduces shock loads induced by the shuttle 134 impacting the seats 136, 138, as compared to a non-hollow configuration.

Further, in some cases, if the pressure differential between pressure levels at the two inlet ports 106, 110 is not substantial (i.e., pressure levels of fluid at the two inlet ports 106, 110 are close to each other), the shuttle 134 can be positioned in the middle of its stroke rather than being pushed all the way to one of the seats 136, 138. The shape and configuration of the shuttle 134 relative to the opening 502 prevents the shuttle 134 from being force or squeezed through the outlet port 114.

Referring to FIG. 5, in examples, the valve body 102 can have a transverse section 506 having a mounting hole 508 formed through the transverse section 506. The transverse section 506 can operate as a fixture where a fastener can be inserted through the mounting hole 508 to mount or affix the shuttle valve 100 to a frame of a machine, for example, to install the shuttle valve 100 to the machine.

FIG. 6 illustrates a flowchart of a method 600 of assembling a shuttle valve, in accordance with an example implementation. The method 600 can, for example, be used to assemble the shuttle valve 100.

The method 600 includes operations or actions as illustrated by blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 includes providing the valve body 102 of the shuttle valve 100, wherein the valve body 102 comprises a longitudinal cylindrical bore, the first inlet port 106, the second inlet port 110, and the outlet port 114, and wherein the valve body 102 comprises the key 500 that protrudes radially inward within the longitudinal cylindrical bore.

The term "providing" as used herein, and for example with regard to the valve body 102 or other components includes any action to make the valve body 102 or any other component available for use, such as supplying the valve body 102 or bringing the valve body 102 to an apparatus or to a work environment for further processing (e.g., mounting other components, etc.).

At block 604, the method 600 includes inserting or mounting the shuttle 134 in the longitudinal cylindrical bore of the valve body 102, wherein the shuttle 134 comprises a plurality of radial protrusions (e.g., the radial protrusions 206, 208, 210) that protrude radially outward from the central portion 200 of the shuttle 134, wherein the plurality of radial protrusions are circumferentially spaced apart in an array about a peripheral surface of the central portion 200, and wherein the key 500 of the valve body 102 is interposed between two radial protrusions (e.g., the radial protrusions 206, 210) of the plurality of radial protrusions.

At block 606, the method 600 includes mounting the first fitting 104 to the first inlet port 106, the second fitting 108 to the second inlet port 110, and the third fitting 112 to the outlet port 114, wherein either the first fitting 104 or the second fitting 108 forms the first seat 136 for the shuttle 134, wherein the valve body 102 forms the second seat 138 for the shuttle 134.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A shuttle valve comprising:
a valve body comprising a longitudinal cylindrical bore, a first inlet port, a second inlet port, an outlet port, and wherein the valve body consists of no more than one key that protrudes radially inward within the longitudinal cylindrical bore; and
a shuttle mounted in the longitudinal cylindrical bore and configured to move axially therein, wherein the shuttle comprises a plurality of radial protrusions that protrude radially outward from, and are circumferentially spaced apart about, a peripheral surface of the shuttle, and wherein the key of the valve body is interposed between a first radial protrusion and a second radial protrusion of the plurality of radial protrusions, such that the key of the valve body interacts with the first radial protrusion to preclude the shuttle from rotating about a longitudinal axis of the shuttle in a first direction by more than a threshold angle, and interacts with the second radial protrusion to preclude the shuttle from rotating about the longitudinal axis of the shuttle in a second direction by more than the threshold angle, wherein the shuttle is configured to shift between: (i) a first position adjacent to the first inlet port, wherein at the first position the shuttle blocks the first inlet port while allowing the second inlet port to be fluidly coupled to the outlet port, and (ii) a second position adjacent to the second inlet port, wherein at the second position the shuttle blocks the second inlet port while allowing the first inlet port to be fluidly coupled to the outlet port.

2. The shuttle valve of claim 1, further comprising:
a first fitting mounted to the first inlet port, a second fitting mounted to the second inlet port, and a third fitting mounted to the outlet port, wherein either the first fitting or the second fitting forms a first seat for the shuttle to interact therewith when the shuttle is in the first position, and wherein the valve body forms a second seat for the shuttle to interact therewith when the shuttle is in the second position.

3. The shuttle valve of claim 1, wherein the key is shaped as an arc that protrudes into a curved space between the two radial protrusions of the plurality of radial protrusions.

4. The shuttle valve of claim 1, wherein the shuttle comprises a central portion interposed between a first end portion and a second end portion, wherein the plurality of radial protrusions protrude radially outward from, and are circumferentially spaced apart about, the peripheral surface of the central portion, and wherein the central portion has a larger diameter than respective diameters of the first end portion and the second end portion.

5. The shuttle valve of claim 4, wherein the plurality of radial protrusions extend longitudinally for at least a partial length of the central portion.

6. The shuttle valve of claim 4, wherein the central portion comprises a first flanged portion at a first end thereof, a second flanged portion at a second end thereof, and a middle portion disposed between the first flanged portion and the second flanged portion, wherein the middle portion has a smaller diameter compared to the first flanged portion and the second flanged portion.

7. The shuttle valve of claim 4, wherein the first end portion of the shuttle comprises a first annular groove configured to receive a first radial seal therein, and wherein the second end portion of the shuttle comprises a second annular groove configured to receive a second radial seal therein.

8. The shuttle valve of claim 1, wherein the second inlet port is coaxial with, and mounted opposite to, the first inlet port, and wherein the outlet port is disposed transverse to the first inlet port and the second inlet port.

9. A fluid system comprising:
a first source of pressurized fluid;
a second source of pressurized fluid; and
a shuttle valve comprising:
a valve body comprising a longitudinal cylindrical bore, a first inlet port fluidly coupled to the first source, a second inlet port fluidly coupled to the second source, an outlet port, and wherein the valve body consists of no more than one key that protrudes radially inward within the longitudinal cylindrical bore, and
a shuttle mounted in the longitudinal cylindrical bore and configured to move axially therein, wherein the shuttle comprises a plurality of radial protrusions that protrude radially outward from, and are circumferentially spaced apart about, a peripheral surface of the shuttle, and wherein the key of the valve body is interposed between a first radial protrusion and a second radial protrusion of the plurality of radial protrusions, such that the key of the valve body interacts with the first radial protrusion to preclude the shuttle from rotating about a longitudinal axis of the shuttle in a first direction by more than a threshold angle, and interacts with the second radial protrusion to preclude the shuttle from rotating about the longitudinal axis of the shuttle in a second direction by more than the threshold angle, wherein the shuttle is configured to shift between: (i) a first position adjacent to the first inlet port, wherein at the first position the shuttle blocks the first inlet port while allowing pressurized fluid to flow from the second source through the second inlet port to the outlet port, and (ii) a second position adjacent to the second inlet port, wherein at the second position the shuttle blocks the second inlet port while allowing pressurized fluid to flow from the first source through the first inlet port to the outlet port.

10. The fluid system of claim 9, wherein the shuttle valve further comprises:
a first fitting mounted to the first inlet port and fluidly coupled to the first source, a second fitting mounted to the second inlet port and fluidly coupled to the second source, and a third fitting mounted to the outlet port, wherein either the first fitting or the second fitting forms a first seat for the shuttle to interact therewith when the shuttle is in the first position, and wherein the valve body forms a second seat for the shuttle to interact therewith when the shuttle is in the second position.

11. The fluid system of claim 9, wherein the key is shaped as an arc that protrudes into a curved space between the two radial protrusions of the plurality of radial protrusions.

12. The fluid system of claim 9, wherein the shuttle comprises a central portion interposed between a first end portion and a second end portion, wherein the plurality of radial protrusions protrude radially outward from, and are circumferentially spaced apart about, the peripheral surface of the central portion, and wherein the central portion has a larger diameter than respective diameters of the first end portion and the second end portion.

13. The fluid system of claim 12, wherein plurality of radial protrusions extend longitudinally for at least a partial length of the central portion.

14. The fluid system of claim 12, wherein the central portion comprises a first flanged portion at a first end thereof, a second flanged portion at a second end thereof, and a middle portion disposed between the first flanged portion and the second flanged portion, wherein the middle portion has a smaller diameter compared to the first flanged portion and the second flanged portion.

15. A method of assembling a shuttle valve, the method comprising:
providing a valve body of the shuttle valve, wherein the valve body comprises a longitudinal cylindrical bore, a first inlet port, a second inlet port, and an outlet port, and wherein the valve body consists of no more than one key that protrudes radially inward within the longitudinal cylindrical bore; and
mounting a shuttle in the longitudinal cylindrical bore of the valve body, wherein the shuttle comprises a plurality of radial protrusions that protrude radially outward from a central portion of the shuttle, wherein the plurality of radial protrusions are circumferentially spaced apart about a peripheral surface of the central portion, and wherein the key of the valve body is interposed between a first radial protrusion and a second radial protrusion of the plurality of radial protrusions, such that the key of the valve body interacts with the first radial protrusion to preclude the shuttle from rotating about a longitudinal axis of the shuttle in a first direction by more than a threshold angle, and interacts with the second radial protrusion to preclude the shuttle from rotating about the longitudinal axis of the shuttle in a second direction by more than the threshold angle.

16. The method of claim 15, further comprising:
mounting a first fitting to the first inlet port, a second fitting to the second inlet port, and a third fitting to the outlet port, wherein either the first fitting or the second fitting forms a first seat for the shuttle, and wherein the valve body forms a second seat for the shuttle.

17. The method of claim 15, wherein the valve body further comprises a transverse section having a mounting hole formed therethrough, the method further comprising:
mounting a fastener through the mounting hole to affix the shuttle valve to a frame.

18. The method of claim 15, wherein the shuttle further comprises a first end portion and a second end portion, such that the central portion is interposed between the first end portion and the second end portion, wherein the first end portion comprises a first annular groove and the second end portion comprises a second annular groove, the method further comprising:
mounting a first radial seal in the first annular groove; and
mounting a second radial seal in the second annular groove.

* * * * *